(12) United States Patent
Lecue et al.

(10) Patent No.: US 10,824,647 B2
(45) Date of Patent: Nov. 3, 2020

(54) REAL-TIME PREDICTION AND EXPLANATION OF SEQUENCES OF ABNORMAL EVENTS

(71) Applicant: Accenture Global Solutions Limited, Dublin (IE)

(72) Inventors: Freddy Lecue, Dublin (IE); Alejandro Cabello Jiménez, Santiago de Compostela (ES)

(73) Assignee: Accenture Global Solutions Limited, Dublin (IE)

( * ) Notice: Subject to any disclaimer, the term of this patent is extended or adjusted under 35 U.S.C. 154(b) by 298 days.

(21) Appl. No.: 15/816,774

(22) Filed: Nov. 17, 2017

(65) Prior Publication Data

US 2019/0155940 A1    May 23, 2019

(51) Int. Cl.
| G06F 17/00 | (2019.01) |
| G06F 16/28 | (2019.01) |
| G06F 16/901 | (2019.01) |
| G06F 16/2457 | (2019.01) |
| G06Q 10/04 | (2012.01) |

(52) U.S. Cl.
CPC ...... *G06F 16/285* (2019.01); *G06F 16/24575* (2019.01); *G06F 16/9024* (2019.01); *G06Q 10/04* (2013.01)

(58) Field of Classification Search
None
See application file for complete search history.

(56) References Cited

U.S. PATENT DOCUMENTS

| 9,591,006 | B2* | 3/2017 | Siva Kumar | H04L 63/083 |
| 9,652,310 | B1* | 5/2017 | Graham | G06F 9/546 |
| 2007/0124059 | A1* | 5/2007 | Barry | G08G 5/0043 |
| | | | | 701/465 |
| 2007/0217288 | A1* | 9/2007 | Barry | G08G 5/0082 |
| | | | | 367/136 |
| 2009/0016599 | A1* | 1/2009 | Eaton | G06N 20/00 |
| | | | | 382/159 |
| 2010/0004958 | A1* | 1/2010 | Ackermann | G06Q 10/00 |
| | | | | 705/5 |
| 2010/0305984 | A1* | 12/2010 | Ben-Yitschak | G06Q 10/02 |
| | | | | 705/6 |
| 2012/0017164 | A1* | 1/2012 | Erling | G06Q 10/10 |
| | | | | 715/771 |
| 2015/0206072 | A1* | 7/2015 | Fabris | G06Q 10/02 |
| | | | | 705/5 |

(Continued)

*Primary Examiner* — Hasanul Mobin
(74) *Attorney, Agent, or Firm* — Fish & Richardson P.C.

(57) ABSTRACT

Implementations are directed to providing a semantic sequence based on a sequence associated with the event, and context data provided from a knowledge graph, receiving a set of cases associated with at least one entity included in the event, the set of cases including previous instances of events, and actions performed to resolve the previous instances of events, defining a sub-set of cases from the set of cases based on the context data, for each case of the sub-set of cases, determining a similarity score, each similarity score representing a degree of similarity between the event, and a case of the sub-set of cases, determining an explanation based on features of cases in the sub-set of cases based on the context data, and providing one or more actions based on actions of cases in the sub-set of cases.

30 Claims, 4 Drawing Sheets

(56) References Cited

U.S. PATENT DOCUMENTS

| | | | |
|---|---|---|---|
| 2015/0254311 A1* | 9/2015 | Lerner | G06F 16/248 |
| | | | 707/722 |
| 2016/0027048 A1* | 1/2016 | Ma | G06Q 30/0254 |
| | | | 705/14.52 |
| 2016/0125320 A1* | 5/2016 | Metzger | G06F 16/287 |
| | | | 705/5 |
| 2017/0140041 A1* | 5/2017 | Dotan-Cohen | G06Q 10/101 |
| 2018/0374019 A1* | 12/2018 | Basanets | G06Q 10/047 |

* cited by examiner

REAL-TIME PREDICTION AND EXPLANATION OF SEQUENCES OF ABNORMAL EVENTS

BACKGROUND

Occurrences in systems, such as abnormal signals and/or events, can result in unexpected downtime, while an explanation, and actions for resolution are determined. Traditional platforms for predicting, and/or diagnosing abnormal signals/events do so in context-free domains. That is, the context of the domain is not considered in diagnosing, and resolving the occurrences. This results in inefficient use of resources in resolving the occurrences.

SUMMARY

Implementations of the present disclosure are generally directed to a computer-implemented platform for real-time prediction and explanation of sequences of abnormal events. More particularly, implementations of the present disclosure are directed to diagnosis (e.g., prediction, explanation) of occurrences based on semantic sequencing to provide context of a respective domain, and one or more actions for resolution.

In some implementations, actions include providing a semantic sequence based on a sequence associated with the event, and context data provided from a knowledge graph, receiving a set of cases associated with at least one entity included in the event, the set of cases including previous instances of events, and actions performed to resolve the previous instances of events, defining a sub-set of cases from the set of cases based on the context data, for each case of the sub-set of cases, determining a similarity score, each similarity score representing a degree of similarity between the event, and a case of the sub-set of cases, determining an explanation based on features of cases in the sub-set of cases based on the context data, and providing one or more actions based on actions of cases in the sub-set of cases. Other implementations of this aspect include corresponding systems, apparatus, and computer programs, configured to perform the actions of the methods, encoded on computer storage devices.

These and other implementations can each optionally include one or more of the following features: actions further include receiving input data from one or more domain-specific data sources, at least a portion of the input data being received in real-time; the similarity scores are determined based on a respective plurality of temporal similarity scores, each temporal similarity score representing a degree of similarity between features within a temporal window of the event, and a respective case; the explanation is determined from features of cases in the sub-set of cases based on respective feature scores, and subsumption of two or more features; the one or more actions are provided based on subsumption of two or more actions provided in the set of cases; the explanation and the one or more actions are transmitted to a computer-implemented system; the event and the knowledge graph correspond to an airline flight domain; the event includes one of a flight delay, and a flight cancellation; for each case in the set of cases, determining a temporal sequence of the events; and actions further include providing the knowledge graph based on the temporal sequence of the events.

Implementations of the present disclosure provide one or more of the following advantages. In some examples, time- and resource-efficient: determination of sequences of occurrences is provided; determination of abnormal sequences of occurrences; provision of an explanation for abnormal sequences of occurrences; and use of semantic description of sequences of occurrences to derive abnormalities and explanation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

As introduced above, occurrences in systems, such as abnormal signals and/or events, can result in unexpected downtime, while an explanation, and actions for resolution are determined. Implementations of the present disclosure are generally directed to a computer-implemented platform for real-time prediction and explanation of sequences of occurrences, such as abnormal signals/events. More particularly, implementations of the present disclosure are directed to diagnosis (e.g., prediction, explanation) of occurrences based on semantic sequencing to provide context of a respective domain, and one or more actions for resolution. As described in further detail herein, implementations include receiving data representative of temporal events within a domain (e.g., normal events, abnormal events), determining contexts of the events, and providing quantifiable and temporal evidence of abnormalities. In some implementations, one or more actions for resolving an abnormality are provided.

Implementations of the present disclosure are described in further detail herein with reference to an example context. The example context includes flight delays in a flight domain. More particularly, the example context includes diagnosing, and providing explanations for flight delays, and one or more actions for resolving the flight delays. It is contemplated, however, that implementations of the present disclosure can be applicable in any appropriate context.

Figure 1:
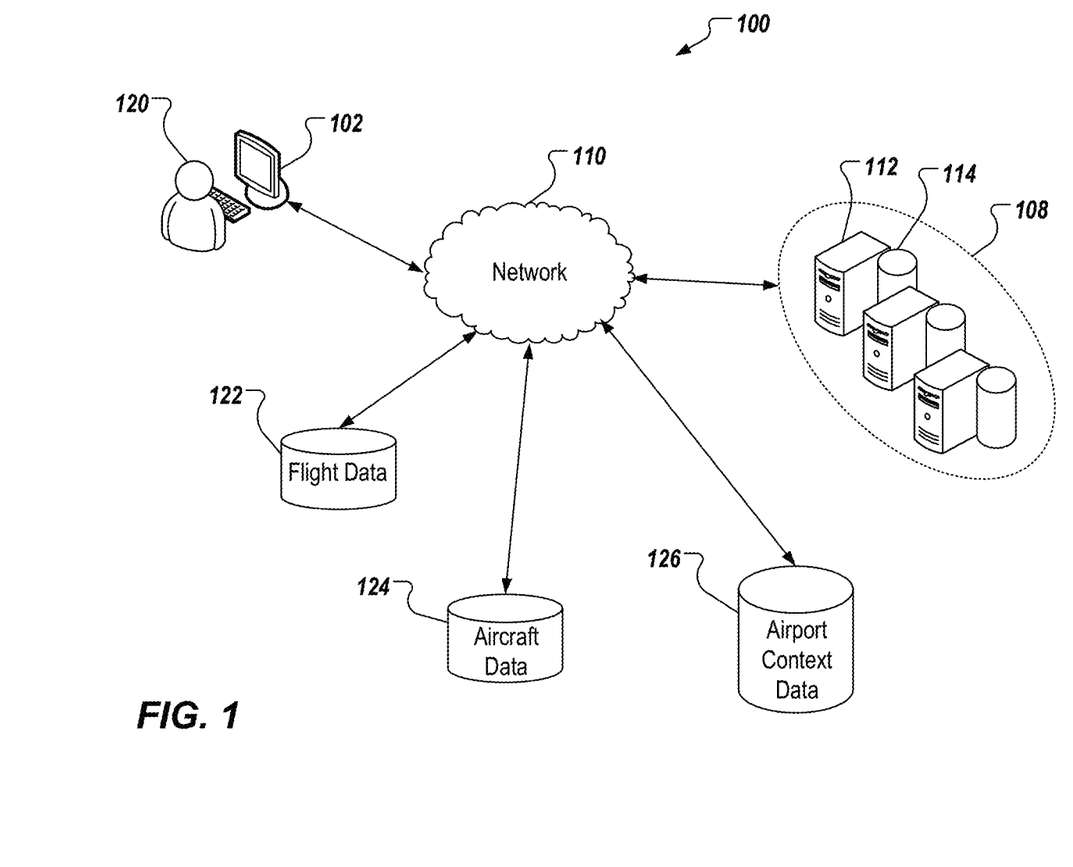
FIG. 1 depicts an example system that can execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for executing predictive models, and interpreting results of predictive models in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

The example system 100 also includes a plurality of domain-specific data sources 120. In accordance with the example context, example domain-specific data sources include, without limitation, a flight data source 122, an aircraft data source 124, and an airport context data source 126. In some examples, one or more domain-specific data sources can be provided from a single provider. For example, an airline operator can provide one or more of the flight data source 122, the aircraft data source 124, and the airport context data source 126. In some examples, one or more domain-specific data sources can be provided from multiple providers. For example, an airline operator can provide the flight data source 122, and the aircraft data source 124, and an airport operator can provide the airport context data source 126. Although not depicted in FIG. 1, an example domain-specific data source can include a historical flight data source, which records data representing previously completed flights, any abnormal events (e.g., delays, cancellations), and any actions taken to resolve such events.

In some implementations, the back-end system 108 hosts the computer-implemented platform for real-time prediction and explanation of sequences of occurrences in accordance with implementations of the present disclosure. For example, and as described herein, the platform receives data from the domain-specific data sources 122, 124, 126, and processes the data to diagnose, and providing explanations for flight delays, and one or more actions for resolving the flight delays.

As introduced above, implementations of the present disclosure are directed to a computer-implemented platform for real-time prediction and explanation of sequences of occurrences, such as abnormal signals/events. More particularly, implementations of the present disclosure are directed to diagnosis (e.g., prediction, explanation) of occurrences (e.g., flight delays, flight cancellations) based on semantic sequencing to provide context of a respective domain (e.g., flights). As described in further detail herein, implementations include receiving data representative of temporal events within a domain (e.g., normal events, abnormal events), determining contexts of the events, and providing quantifiable and temporal evidence of abnormalities. In some implementations, one or more actions for resolving an abnormality are provided.

In accordance with implementations of the present disclosure, domain-specific relationships between entities are provided that are specific to the example context. In the example context, the domain-specific relationships include, without limitation, relationships between airline operators, aircraft, flights, airports, cities, countries, and the like. In some implementations, the relationships are provided in a knowledge graph, or a portion of a knowledge graph. In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

Figure 2:
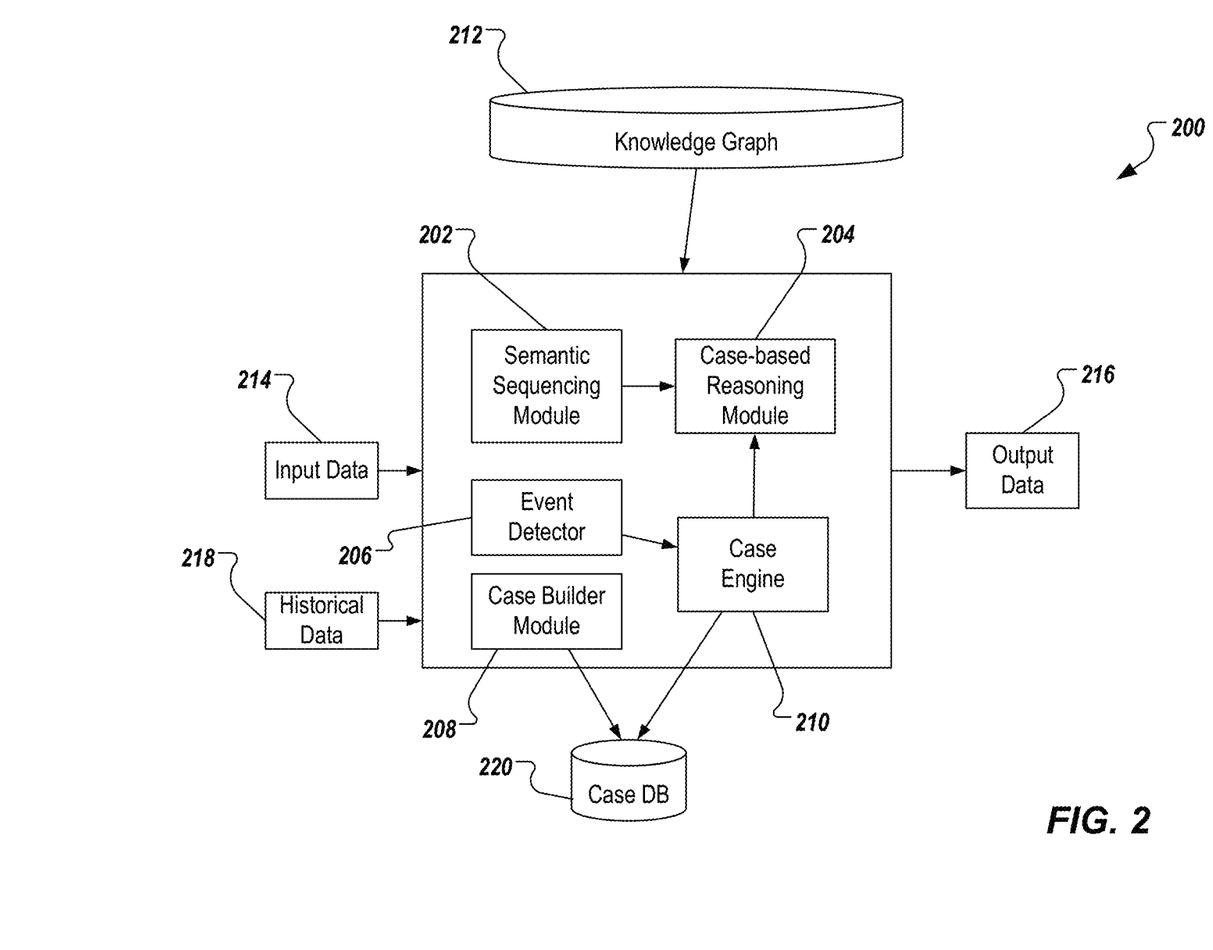
FIG. 2 depicts an example module architecture in accordance with implementations of the present disclosure.

FIG. 2 depicts an example module architecture 200 in accordance with implementations of the present disclosure. The example module architecture 200 includes a semantic sequencing module 202, a case-based reasoning module 204, an event detector 206, a case builder module 208, and a case evaluation engine 210. In some examples, information recorded in a knowledge graph 212 is processed in response to input data 214 to provide output data 216. In some examples, and as described in further detail below, historical data 218 is processed to provide one or more cases, which are stored in a case database 220.

In some implementations, at least a portion of the input data 214 includes flight data that is representative of one or more upcoming flights (e.g., hourly, daily, weekly). For a flight, example flight data can include, without limitation, date of flight, flight number, aircraft identifier, scheduled departure time, scheduled arrival time, departure airport, arrival airport, and the like. For example:

TABLE 1

Example Flight Data

| Date | Flight No. | Sch. Dep. | Sch. Arr. | From | To |
|---|---|---|---|---|---|
| 2017 Nov. 1 | FLT412 | 09:10 | 10:40 | DUB | AMS |
| ... | ... | ... | ... | ... | ... |

In some implementations, at least a portion of the input data 214 includes aircraft data that is representative of an aircraft that is to perform the flight. Example aircraft data can include, without limitation, aircraft identifier, number of passengers, number of bags, and the like. For example:

TABLE 2

Example Aircraft Data

| Aircraft ID | No. Passengers | No. Bags |
|---|---|---|
| PT0142 | 246 | 201 |
| ... | ... | ... |

In some implementations, at least a portion of the input data 214 includes airport context data that is representative of a temporal context of respective airports. Example airport context data can include, without limitation, airport code, current temperature, previous temperatures, forecasted temperatures, current/previous/forecasted wind speeds, current/previous/forecasted wind directions, current/previous/forecasted visibilities, current/previous/forecasted weather events (e.g., rain, snow, fog, sleet). For example:

TABLE 3

Example Airport Context Data

| Airport | Temp (C.) | Wind Sp. (kts) | Wind Dir. | Visibility (km) | Events |
|---|---|---|---|---|---|
| DUB | 10 | 15 | SE | 5 | Rain |
| AMS | 7 | 2 | E | 2 | Fog |
| ... | ... | ... | ... | ... | ... |

In some implementations, the output data 216 includes, for each event, an explanation as to why the event will occur, or has occurred, as well as one or more actions that can be taken to resolve the event. Example actions can include, without limitation, repair aircraft, replace aircraft, and crew substitution. For example:

TABLE 4

Example Output Data

| Date | Flight No. | Sch. Dep. | Sch. Arr. | Status | Expl'n | Action |
|---|---|---|---|---|---|---|
| 2017 Nov. 1 | FLT412 | 09:10 | 10:40 | Delayed | Flight leaving an English-speaking country, and arriving at a rainy location," | Aircraft Action |
| ... | ... | ... | ... | ... | ... | ... |

In some implementations, the historical data is representative of previously completed flights and includes respective flight data, aircraft data, airport context data, events (e.g., delays, cancellations), if any, and actions performed to resolve events, if any. For example:

TABLE 5

Example Historical Data

| Date | Flight No. | Delay Reason | Action |
|---|---|---|---|
| 2017 Sep. 9 | FLT65 | Mechanical | Replace plane |
| 2017 Sep. 21 | FLT379 | Crew | Reassign crew |
| ... | ... | ... | ... |

Although not detailed in Table 5, historical data can further include airport context data, and any other appropriate data associated with the respective events. In some examples, for each event, at least a portion of the historical data is provided in multiple, temporal windows (e.g., time intervals). Example temporal windows can include, without limitation, past 5 minutes, past 15 minutes, and past X hour(s) (e.g., X=1, 2, 3, 4, 6, 12, 24, 48, 72). In some examples, past is measured from a given point-in-time (e.g., a current time, at which the input data 214 is received).

In some implementations, the case builder provides cases based on historical data, which cases are stored in a case database. In some examples, each case corresponds to an event (e.g., abnormal event) that had previously occurred, and include historical data associated with the event. In some examples, the historical data of the case is provided in temporal windows, as described above. In some examples, a set of cases is provided for respective entities. For example, a first set of cases can be provided for a first airport (e.g., DUB), and a second set of cases can be provided for a second airport (e.g., AMS).

In some implementations, the case builder module 208 receives at least a portion of the historical data 218, and processes the historical data 218 to provide one or more cases recorded as incident data. In some examples, a case is provided as a data set that represent an occurrence of an event (e.g., an abnormal event), domain-specific data associated with the event, and one or more actions taken to resolve the event. For example, and in the example context, a case can include a data set representing a delayed flight (e.g., flight number, date, departure airport, scheduled departure time, actual departure time, arrival airport, scheduled arrival time, actual arrival, weather conditions, weather events, category of delay, action(s) to resolve delay). Cases provided by the case builder module 208 are stored in the case database 220. In some implementations, cases are provided by the case builder module 208 after an event has been resolved. For example, in response to resolution of the event, historical data representative of the event is provided to the case builder module 208 to provide a case representative of the event, and provide the case as incident data to the case database 220.

In further detail, the case builder module 208 groups sequence of occurrences based on similarity of descriptions (e.g., to provide clusters). In some examples, a description is provided as a set of features (e.g., a feature vector). Example descriptions can include, without limitation, temporal information, spatial description, categorical description, and numerical description. In some implementations, a semantic description is used to enable time-, and resource-efficient comparisons of occurrences.

In some implementations, a unique name is determined for each cluster. In some examples, the name of each is provided based on the top-k similar descriptions. To illustrate, a cluster can include a context of sequences of flights, where the highest similarity is along spatial description (e.g., Europe), temporal description (e.g., afternoon), airline nature (e.g., French-speaking airline companies), and status (e.g., delayed). In such a context, the cluster can be assigned the name "Late-delayed French-speaking airline companies traveling to Europe on afternoon." In some examples, and as illustrated in the above example, the naming convention is a concatenation of highest-ranked (with respect to similarity) features in the respective cluster. In some examples, the naming convention enables retrieval of the context and explanation, when comparing cases, as described in further detail herein.

As described in further detail herein, implementations of the present disclosure receive real-time input data (e.g., at least a portion of the input data 214 of FIG. 2), and process the real-time input to provide real-time output data (e.g., at least a portion of the output data 216 of FIG. 2). In some examples, real-time describes actions that can be automatically executed, without requiring human input and without any intentional delay, taking into account the processing limitations of the data input service, and any time required to process data. For example, real-time input data can include input data automatically provided from one or more data sources (e.g., the domain-specific data sources 122, 124, 126 of FIG. 1). In some examples, at least a portion of the input data is provided on a periodic basis (e.g., updated every X mins/secs/hours/days). In some examples, at least a portion of the input data is provided on a triggered basis (e.g., a change in data triggers an update to be provided as input data). For example, in response to the weather event "rainy" changing to "sunny," updated airport context data is provided.

In some implementations, the semantic sequencing module 202 processes at least a portion of the input data 214 to determine the existence of an abnormal event, and provide a context-specific sequence associated with the event. In some examples, the context-specific sequence includes a temporal dimension, as described in further detail herein. In some examples, the context-specific sequence is based on semantic context that is provided using at least a portion of the knowledge graph 212. For example, a sequence of events can be provided (e.g., flight from DUB to AMS), and for each entity in the sequence (e.g., airport), context data can be provided from the knowledge graph. In this manner, the sequence is "dressed" in context data provided from the knowledge graph.

Figure 3:
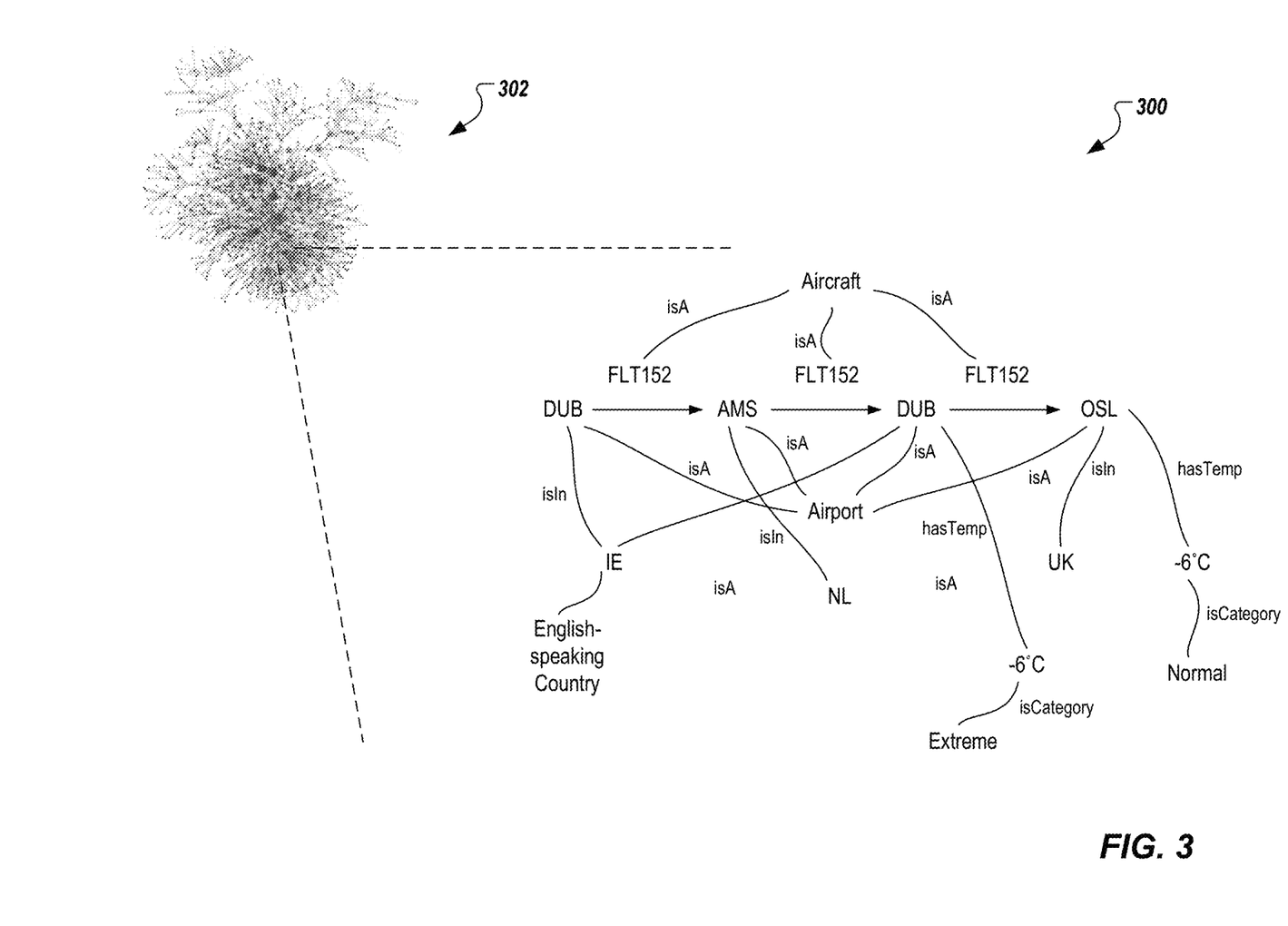
FIG. 3 depicts an example portion of an example knowledge graph.

FIG. 3 depicts an example semantic sequence 300 determined based on a knowledge graph 302, which represents at least a portion of the domain of the example context. In the example of FIG. 3, concepts corresponding to the example context are provided as nodes, and relationships between concepts are provided as edges. In accordance with the example context, concepts of the example semantic sequence 300 include aircraft, flight numbers, airports (e.g., DUB, AMS, OSL), countries (e.g., Ireland (IE), Netherlands (NL), Norway (NO)), weather conditions (e.g., temperature), and categories (e.g., extreme, normal). In accordance with implementations of the present disclosure, the knowledge graph provides context data. For example, the example semantic sequence 300 of FIG. 3 provides context data indicating that Ireland is an English-speaking country, context data that a temperature of −6° C. is considered extreme for the Dublin airport, and context data that a temperature of −6° C. is considered normal for the Oslo airport. It is appreciated that the context data provided in the example of FIG. 3 is not exhaustive of the context data that can be provided in the knowledge graph 302. It is contemplated that the knowledge graph 302 can record any appropriate context data for the given domain (e.g., flights).

In some implementations, the event detector module 206 receives at least a portion of the input data 214 to determine the occurrence of an event (e.g., an abnormal event). In some examples, an event can correspond to a condition determined from the input data 214. In the example context, a condition can include weather determined from the airport context data. For example, if the input data 214 indicates rain, and/or fog, an event can be triggered.

In some implementations, the case evaluation engine 210 receives an event from the event detector, and retrieves one or more cases from the case database 220. In some examples, the event is provided as a data set representative of the event. In the example context, an event can include flight data, aircraft data, airport context data, and the like. The case evaluation engine 210 queries the case database 220 to retrieve a set of cases. In some examples, the case database 220 is queried for the particular entity (e.g., airport) that the event is associated with, and a set of cases is returned from the case database, the set of cases including cases associated with that entity.

In accordance with implementations of the present disclosure, the event is compared to each case based on temporal windows to determine respective similarity scores. For example, if the set of cases includes cases $C_1$, $C_2$, $C_3$, a set of similarity scores $S_1$, $S_2$, $S_3$ is provided, each similarity representing a degree of similarity between the event, and each of the respective cases. In some examples, each similarity score is determined based on a plurality of temporal similarity scores. More particularly, for each temporal window of a case, a temporal similarity score is determined. For example, a case C can include temporal windows $c_{[w1]}$, $c_{[w2]}$, $c_{[w3]}$, and respective temporal similarity scores $s_{[t1]}$, $s_{[t2]}$, $s_{[t3]}$ can be determined. The similarity score for the event and respective case can be determined based on an aggregation of the temporal similarity scores.

In some implementations, the temporal similarity scores are determined based on comparing features between a temporal window of the event, and features of a respective temporal window of the case being compared. In some examples, and in the example context, features include at least a portion of the flight data, aircraft data, airport context data. For example, for each temporal window, temperature, wind speed, wind direction, visibility, and weather events can be compared as between the event, and the case being considered. In some examples, a similarity function is provided that assigns a feature score (e.g., numerical value, [0, 1]) for each feature comparison, and the feature scores are aggregated (e.g., summed). In some examples, the temporal similarity score is determined as the quotient of the aggregated feature scores, and the number of features.

In some implementations, feature scores of higher value can be used as a semantic explanation, as to why the particular case, and/or temporal window of the particular case is similar to the event. For example, if, for the temporal window being considered, both the event, and the case include the weather event "sunny," the term "sunny" can be used as an explanation as to why the event and case, for the temporal window, are similar. If, on the other hand, and for the temporal window being considered, the event includes the weather event cloudy, and the case includes the weather event "sunny," or vice-versa, this feature would not be used for a similarity explanation.

In some implementations, a sub-set of cases is provided from the set of cases, the sub-set of cases including cases having a similarity score that exceed a threshold similarity score. In some examples, each case in the sub-set of cases is associated with an explanation of similarity (e.g., determined from comparing the respective features, as described above). In the example context, an example sub-set of cases can include:

TABLE 6

Example Sub-Set of Cases

| Case | Similarity Score | Sim. Explanation | Action |
|------|------------------|------------------|--------|
| Case1 | 0.89 | (Weather, 0.8) (LateCheckIn, 0.4) (English, 0.9) | Replace Aircraft |
| Case2 | 0.81 | (Repair, 0.6) | Service Aircraft |
| . . . | . . . | . . . | . . . |

In the example of Table 6, the similarity explanations include pairs of features, and feature scores, and the actions include the actions that had been performed to resolve the respective case.

In accordance with implementations of the present disclosure, a semantic sequence of the current event, and the sub-set of cases are processed by the case-based reasoning module 204 to provide the output 216. More particularly, the case-based reasoning module 204 processes semantic sequence of the current event, and the sub-set of cases to provide an explanation for the event, and one or more actions recommended to resolve the event. In some examples, and as described in further detail herein, the explanation is provided as an abstraction of the feature-based similarity explanations (e.g., described above, and provided by example in Table 6).

In some implementations, a common explanation (CE) is determined for each case in the set of cases. In some examples, the common explanation includes feature similarity explanations that exceed a threshold feature similarity score. In some examples, remaining feature similarity explanations are grouped by graph subsumption, or sub-graph pattern matching of the features in the knowledge graph. In some examples, graph subsumption is provided as an instance of graph isomorphism, in which isomorphism exists when two graphs are equivalent. For example, two graphs having edges and vertices, and which contain the same number of vertices connected in the same way are said to be isomorphic. Subsumption aims at identifying specification-based relationships of entities. For example, and in the example context, rain at departure, and rain at destination can be subsumed under the same entity (or category) (e.g., rain, weather). More plainly stated, the features can be grouped based on categories to provide the most general categories that address the features. In this manner, the categories provide an abstraction of the feature similarity explanations.

In some examples, the explanation provided by the case-based reasoning module 204 include the so-determined categories. Continuing with the examples above from the example context, an example explanation can include "Flight leaving an English-speaking country, and arriving at a rainy location," where "English-speaking" and "rainy" are categories determined from subsumption, as described herein.

Similarly, subsumption can be used with the actions of the cases in the sub-set of cases to provide a recommended action. For example, each action can be generalized to a higher-level entity in the knowledge graph, and the higher-level action that is common to all actions can be provided as the recommended action. For example, Table 6 provides example actions of "replace aircraft," and "service aircraft," each of which can be a type of "aircraft action" within the knowledge graph. Although both actions could be generalized to higher levels of abstraction, it can be determined that "aircraft action" is the least abstract entity (category) that is common to both. Consequently, aircraft action can be provided as the recommended action that is to be performed to resolve the current event.

Figure 4:
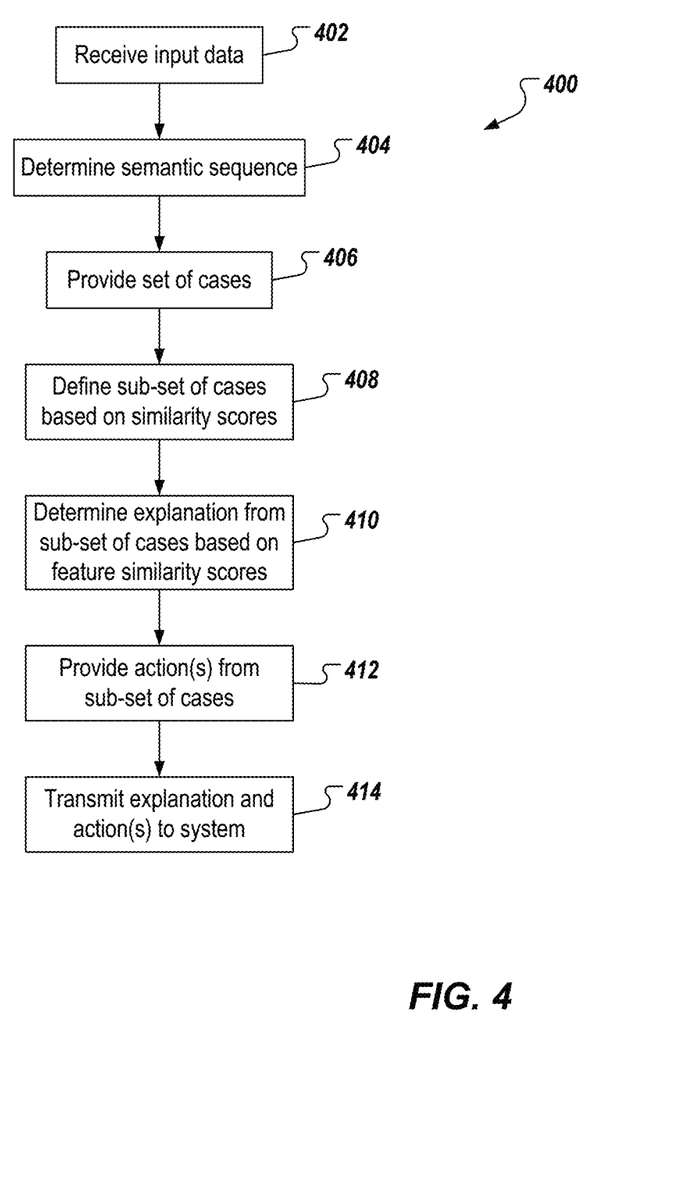
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1). The example process 400 can be executed to provide an explanation for, and actions to resolve an event (e.g., an abnormal event), as described herein.

Input data is received (402). For example, input data 214 can be received by one or both of the semantic sequencing module 202, and the event detector 206 of FIG. 2 (e.g., provided from the one or more domain-specific data sources 122, 124, 126 of FIG. 1). In some examples, at least a portion of the data is provided in real-time (e.g., is streamed, or periodically transmitted. A semantic sequence is determined (404). For example, the semantic sequencing module 202 provides the semantic sequence from at least a portion of the input data 214. In some examples, as described above, context data from a knowledge graph is associated with entities of a sequence to provide the semantic sequence (e.g., the example semantic sequence of FIG. 3).

A set of cases is provided (406). For example, and as described herein, a set of cases is retrieved from the case database 220 by the case engine 210. In some examples, the case engine queries the case database 220 based on an entity (e.g., airport), and a set of cases associated with the entity is returned. A sub-set of cases is defined based on similarity scores (408). For example, the case engine determines the similarity scores, and provides the sub-set of cases. In some examples, similarity scores are determined for each case in the set of cases, as described herein, each similarity score representing a degree of similarity between the case, and a detected event (e.g., an event detected by the event detector 206).

An explanation is determined from the sub-set of cases based on feature similarity scores (410). For example, the sub-set of cases is provided to the case-based reasoning module 204, which determined the explanations. In some examples, and as described herein, the explanation is determined from features of cases in the sub-set of cases based on their respective feature scores (e.g., feature scores exceeding a threshold feature score). In some examples, the features are grouped based on graph subsumption, which groups are returned, and included in the explanation. One or more actions are provided from the sub-set of cases (412). For example, the case-based reasoning module 204 identifies the action(s) based on subsumption of actions associated with each of the cases in the sub-set of cases. The explanation and action(s) are transmitted to a system (414). For example, the explanation and action(s) can be provided as the output data 216, which can be transmitted to one or more back-end systems. For example, the output data 216 can be provided to an enterprise resource planning (ERP) system, an aircraft maintenance systems, a flight scheduling system, and the like.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for automated provision of an explanation for an event, and one or more actions to resolve the event, the method being executed by one or more processors and comprising:

processing, by an event detector, input data to detect an occurrence of an event in response to detecting the occurrence of the event, providing a semantic sequence based on a sequence of entities associated with the event, and context data provided from a knowledge graph, the knowledge graph comprising domain-specific context data that is specific to a domain associated with the event;

receiving a set of cases associated with at least one entity included in the event, cases in the set of cases comprising previous instances of events that have occurred and that are provided based on historical data, and actions that had been performed to resolve the previous instances of events;

defining a sub-set of cases from the set of cases based on the context data;

for each case of the sub-set of cases, determining a similarity score, each similarity score representing a degree of similarity between the event, and a case of the sub-set of cases;

generating an explanation based on features of cases in the sub-set of cases based on the context data, the explanation comprising a concatenation of a set of features including a first feature of a first case in the sub-set of cases and a second feature of a second case in the sub-set of cases, the first feature and the second feature selected for inclusion in the explanation based on respective feature scores each exceeding a threshold feature score, the explanation explaining reasons for the occurrence of the event;

providing one or more actions that can be performed to resolve the event, the one or more actions being provided based on actions of cases in the sub-set of cases; and outputting the explanation and the one or more actions as output data.

2. The method of claim 1, further comprising receiving input data from one or more domain-specific data sources, at least a portion of the input data being received in real-time.

3. The method of claim 1, wherein the similarity scores are determined based on a respective plurality of temporal similarity scores, each temporal similarity score representing a degree of similarity between features within a temporal window of the event, and a respective case.

4. The method of claim 1, wherein the explanation is determined from features of cases in the sub-set of cases based on respective feature scores, and subsumption of two or more features.

5. The method of claim 1, wherein the one or more actions are provided based on subsumption of two or more actions provided in the set of cases.

6. The method of claim 1, wherein the explanation and the one or more actions are transmitted to a computer-implemented system.

7. The method of claim 1, wherein the event and the knowledge graph correspond to an airline flight domain.

8. The method of claim 7, wherein the event comprises one of a flight delay, and a flight cancellation.

9. The method of claim 1, wherein, for each case in the set of cases, determining a temporal sequence of the events.

10. The method of claim 9, further comprising providing a knowledge graph based on the temporal sequence of the events.

11. A non-transitory computer-readable storage medium coupled to one or more processors and having instructions stored thereon which, when executed by the one or more processors, cause the one or more processors to perform operations for automated provision of an explanation for an event, and one or more actions to resolve the event, the operations comprising:

processing, by an event detector, input data to detect an occurrence of an event in response to detecting the occurrence of the event, providing a semantic sequence based on a sequence of entities associated with the event, and context data provided from a knowledge graph, the knowledge graph comprising domain-specific context data that is specific to a domain associated with the event;

receiving a set of cases associated with at least one entity included in the event, cases in the set of cases comprising previous instances of events that have occurred and that are provided based on historical data, and actions that had been performed to resolve the previous instances of events;

defining a sub-set of cases from the set of cases based on the context data;

for each case of the sub-set of cases, determining a similarity score, each similarity score representing a degree of similarity between the event, and a case of the sub-set of cases;

generating an explanation based on features of cases in the sub-set of cases based on the context data, the explanation comprising a concatenation of a set of features including a first feature of a first case in the sub-set of cases and a second feature of a second case in the sub-set of cases, the first feature and the second feature selected for inclusion in the explanation based on respective feature scores each exceeding a threshold feature score, the explanation explaining reasons for the occurrence of the event;

providing one or more actions that can be performed to resolve the event, the one or more actions being provided based on actions of cases in the sub-set of cases; and outputting the explanation and the one or more actions as output data.

12. The non-transitory computer-readable storage medium of claim 11, wherein operations further comprise receiving input data from one or more domain-specific data sources, at least a portion of the input data being received in real-time.

13. The non-transitory computer-readable storage medium of claim 11, wherein the similarity scores are determined based on a respective plurality of temporal similarity scores, each temporal similarity score representing a degree of similarity between features within a temporal window of the event, and a respective case.

14. The non-transitory computer-readable storage medium of claim 11, wherein the explanation is determined from features of cases in the sub-set of cases based on respective feature scores, and subsumption of two or more features.

15. The non-transitory computer-readable storage medium of claim 11, wherein the one or more actions are provided based on subsumption of two or more actions provided in the set of cases.

16. The non-transitory computer-readable storage medium of claim 11, wherein the explanation and the one or more actions are transmitted to a computer-implemented system.

17. The non-transitory computer-readable storage medium of claim 11, wherein the event and the knowledge graph correspond to an airline flight domain.

18. The non-transitory computer-readable storage medium of claim 17, wherein the event comprises one of a flight delay, and a flight cancellation.

19. The non-transitory computer-readable storage medium of claim 11, wherein, for each case in the set of cases, determining a temporal sequence of the events.

20. The non-transitory computer-readable storage medium of claim 19, wherein operations further comprise providing a knowledge graph based on the temporal sequence of the events.

21. A system, comprising:
one or more processors; and
a non-transitory computer-readable storage device coupled to the one or more processors and having instructions stored thereon which, when executed by the one or more processors, cause the one or more processors to perform operations for automated provision of an explanation for an event, and one or more actions to resolve the event, the operations comprising:

processing, by an event detector, input data to detect an occurrence of an event in response to detecting the occurrence of the event, providing a semantic sequence based on a sequence of entities associated with the event, and context data provided from a knowledge graph, the knowledge graph comprising domain-specific context data that is specific to a domain associated with the event;

receiving a set of cases associated with at least one entity included in the event, cases in the set of cases comprising previous instances of events that have occurred and that are provided based on historical data, and actions that had been performed to resolve the previous instances of events;

defining a sub-set of cases from the set of cases based on the context data;

for each case of the sub-set of cases, determining a similarity score, each similarity score representing a degree of similarity between the event, and a case of the sub-set of cases;

generating an explanation based on features of cases in the sub-set of cases based on the context data, the explanation comprising a concatenation of a set of features including a first feature of a first case in the sub-set of cases and a second feature of a second case in the sub-set of cases, the first feature and the second feature selected for inclusion in the explanation based on respective feature scores each exceeding a threshold feature score, the explanation explaining reasons for the occurrence of the event;

providing one or more actions that can be performed to resolve the event, the one or more actions being provided based on actions of cases in the sub-set of cases; and outputting the explanation and the one or more actions as output data.

22. The system of claim 21, wherein operations further comprise receiving input data from one or more domain-specific data sources, at least a portion of the input data being received in real-time.

23. The system of claim 21, wherein the similarity scores are determined based on a respective plurality of temporal similarity scores, each temporal similarity score representing a degree of similarity between features within a temporal window of the event, and a respective case.

24. The system of claim 21, wherein the explanation is determined from features of cases in the sub-set of cases based on respective feature scores, and subsumption of two or more features.

25. The system of claim 21, wherein the one or more actions are provided based on subsumption of two or more actions provided in the set of cases.

26. The system of claim 21, wherein the explanation and the one or more actions are transmitted to a computer-implemented system.

27. The system of claim 21, wherein the event and the knowledge graph correspond to an airline flight domain.

28. The system of claim 27, wherein the event comprises one of a flight delay, and a flight cancellation.

29. The system of claim 21, wherein, for each case in the set of cases, determining a temporal sequence of the events.

30. The system of claim 29, wherein operations further comprise providing a knowledge graph based on the temporal sequence of the events.

* * * * *